(12) United States Patent
Chu et al.

(10) Patent No.: US 10,966,280 B1
(45) Date of Patent: Mar. 30, 2021

(54) TRANSMITTING CONTROL OR STATUS INFORMATION IN AN MPDU DELIMITER

(71) Applicant: NXP USA, Inc., Austin, TX (US)

(72) Inventors: Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 33 days.

(21) Appl. No.: 16/570,178

(22) Filed: Sep. 13, 2019

Related U.S. Application Data

(60) Provisional application No. 62/730,950, filed on Sep. 13, 2018.

(51) Int. Cl.
| | | |
|---|---|---|
| *H04W 80/02* | (2009.01) | |
| *H04W 28/02* | (2009.01) | |
| *H04L 5/00* | (2006.01) | |
| *H04L 1/16* | (2006.01) | |
| *H04W 84/12* | (2009.01) | |

(52) U.S. Cl.
CPC ........... *H04W 80/02* (2013.01); *H04L 1/1607* (2013.01); *H04L 5/0055* (2013.01); *H04W 28/0278* (2013.01); *H04W 84/12* (2013.01)

(58) Field of Classification Search
CPC ............... H04L 1/1607; H04L 1/1685; H04W 28/0278; H04W 28/12; H04W 80/02; H04W 84/12
See application file for complete search history.

(56) References Cited

U.S. PATENT DOCUMENTS

| | | |
|---|---|---|
| 9,826,532 B1 | 11/2017 | Chu et al. |
| 9,942,193 B1 | 4/2018 | Chu et al. |
| 2011/0305176 A1* | 12/2011 | Wentink ............... H04L 1/1607 370/310 |

(Continued)

OTHER PUBLICATIONS

IEEE P802.11 ax™/D2.2, "Draft Standard for Information technology— Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

(Continued)

*Primary Examiner* — Pao Sinkantarakorn

(57) ABSTRACT

A first communication device generates a media access control (MAC) protocol data unit (MPDU) delimiter having i) a feedback indication field and ii) a feedback content field. The feedback indication field is generated to include a first value that indicates the MPDU delimiter includes the feedback content field rather than an MPDU length field corresponding to a second value of the feedback indication field. The feedback content field is generated to include feedback information such as acknowledgement information regarding a communication frame previously transmitted by a second communication device, or control, management, and/or status information regarding the first communication device that was previously requested by the second communication device. The first communication device then transmits a packet that includes the MPDU delimiter to the second communication device.

20 Claims, 10 Drawing Sheets

(56) References Cited

U.S. PATENT DOCUMENTS

2017/0310424 A1* 10/2017 Chun .................. H04L 1/16
2018/0332502 A1* 11/2018 Chu .................... H04L 1/1671

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

\* cited by examiner

TRANSMITTING CONTROL OR STATUS INFORMATION IN AN MPDU DELIMITER

CROSS REFERENCES TO RELATED APPLICATIONS

This application claims the benefit of U.S. Provisional Patent Application No. 62/730,950, entitled "Feedback through MAC Protocol Data Units (MPDU) Delimiter," filed on Sep. 13, 2018, which is incorporated herein by reference in its entirety.

FIELD OF TECHNOLOGY

The present disclosure relates generally to wireless communication systems, and more particularly to use of media access control (MAC) protocol delimiter fields to provide feedback information.

BACKGROUND

In a wireless local area network (WLAN), communication devices exchange control information in media access control (MAC) protocol data units (MPDUs), sometimes referred to as "frames". For example, when a first communication device is to acknowledge reception of a data frame from a second communication device, the first communication device transmits an acknowledgment (ACK) frame to the second communication device that includes an indication of whether the data frame was correctly received (sometimes referred to as "acknowledgment information"). As another example, when a first communication device is prompted by a second communication device to transmit status information, such as an amount of data buffered for transmission at the first communication device (sometimes referred to as "buffer status" information) or an available frequency bandwidth as seen at the first communication device (sometimes referred to as "bandwidth status" information), the first communication device transmits the requested status information to the second communication device in a quality of service (QoS) Null frame.

Frames such as ACK frames and QoS Null frames include a MAC header having several bytes of information, such as a frame control field that indicates a type of the frame, a duration field that indicates a time duration of the frame, an address field that identifies an intended recipient of the frame, a frame check sequence (FCS) field that provides error detection information for indicating whether the MAC header, as received, includes any errors, etc. Much of the information in the MAC header is considered overhead in that such information is not itself the desired information such as the acknowledgement information, the buffer status information, or the bandwidth status information. Overhead tends to limit throughput of a wireless communication system because the overhead occupies wireless transmission time.

SUMMARY

In an embodiment, a method in a wireless communication network is for providing status information. The method includes: receiving, at a first communication device, a request from a second communication device for status information regarding the first communication device; and, in response to receiving the request, generating, at the first communication device, a media access control (MAC) protocol data unit (MPDU) delimiter having i) a feedback indication field and ii) a feedback content field. Generating the MPDU delimiter includes: generating the feedback indication field to include a first value that indicates the MPDU delimiter includes the feedback content field rather than an MPDU length field corresponding to a second value of the feedback indication field, and generating the feedback content field to include requested status information regarding the first communication device. The method further comprises, transmitting, by the first communication device, a packet that includes the MPDU delimiter in response to receiving the request.

In another embodiment, a wireless device comprises: a network interface device associated with a first communication device. The network interface device is implemented on one or more integrated circuit (IC) devices, and is configured to: receive a request from a second communication device for status information regarding the first communication device, and, in response to receiving the request, generate an MPDU delimiter having i) a feedback indication field and ii) a feedback content field. Generating the MPDU delimiter includes: generating the feedback indication field to include a first value that indicates the MPDU delimiter includes the feedback content field rather than an MPDU length field corresponding to a second value of the feedback indication field, and generating the feedback content field to include requested status information regarding the first communication device. The network interface device is further configured to: in response to receiving the request, transmit a packet that includes the MPDU delimiter.

In yet another embodiment, a method in a wireless communication network is for acknowledging a communication frame. The method includes: receiving, at a first communication device, the communication frame from a second communication device; and, in response to receiving the communication frame, generating, at the first communication device, a media access control (MAC) protocol data unit (MPDU) delimiter having i) a feedback indication field and ii) a feedback content field. Generating the MPDU delimiter includes: generating the feedback indication field to include a first value that indicates the MPDU delimiter includes the feedback content field rather than an MPDU length field corresponding to a second value of the feedback indication field, and generating the feedback content field to include acknowledgment information regarding the communication frame. The method further includes transmitting, by the first communication device, a packet that includes the MPDU delimiter in response to receiving the communication frame.

In still another embodiment, a wireless device comprises: a network interface device associated with a first communication device. The network interface device is implemented on one or more IC devices, and is configured to: receive the communication frame from a second communication device; and, in response to receiving the communication frame, generating, at the first communication device, a media access control (MAC) protocol data unit (MPDU) delimiter having i) a feedback indication field and ii) a feedback content field. Generating the MPDU delimiter includes: generating the feedback indication field to include a first value that indicates the MPDU delimiter includes the feedback content field rather than an MPDU length field corresponding to a second value of the feedback indication field, and generating the feedback content field to include acknowledgment information regarding the communication frame. The network interface device is further configured to transmit a packet that includes the MPDU delimiter in response to receiving the communication frame.

DETAILED DESCRIPTION

In prior art wireless communication systems, a wireless communication device transmits multiple media access control (MAC) protocol data units (MPDUs) aggregated together within one MAC data unit, typically referred to as an aggregate MPDU (A-MPDU). To help a receiver distinguish between the different individual MPDUs within the A-MPDU, the wireless communication device includes prior art MPDU delimiter fields (also sometimes referred to herein as "MPDU delimiters") between the individual MPDUs.

In embodiments described below, a wireless communication device transmits feedback information (e.g., acknowledgement, control, and/or status information, or other suitable feedback information) within a new MPDU delimiter field rather than in an MPDU with a MAC header, i.e., transmission of the feedback information is performed without transmitting an MPDU with a MAC header. Such an MPDU delimiter field is typically shorter than an MPDU with a MAC header, thus transmission of feedback information within the MPDU delimiter field takes less time than transmitting the feedback information within an MPDU with a MAC header. Accordingly, transmission of feedback information within the MPDU delimiter field improves overall system throughput, at least in some embodiments. As will be described in more detail below, not all of the information included in a prior art MAC header is needed when transmitting feedback information and/or can be determined using information in a PHY header of a packet that includes the feedback information and/or can be assumed (or deduced) based on a timing of transmission of the packet, thus permitting the omission of a MAC header, according to some embodiments.

Figure 1:
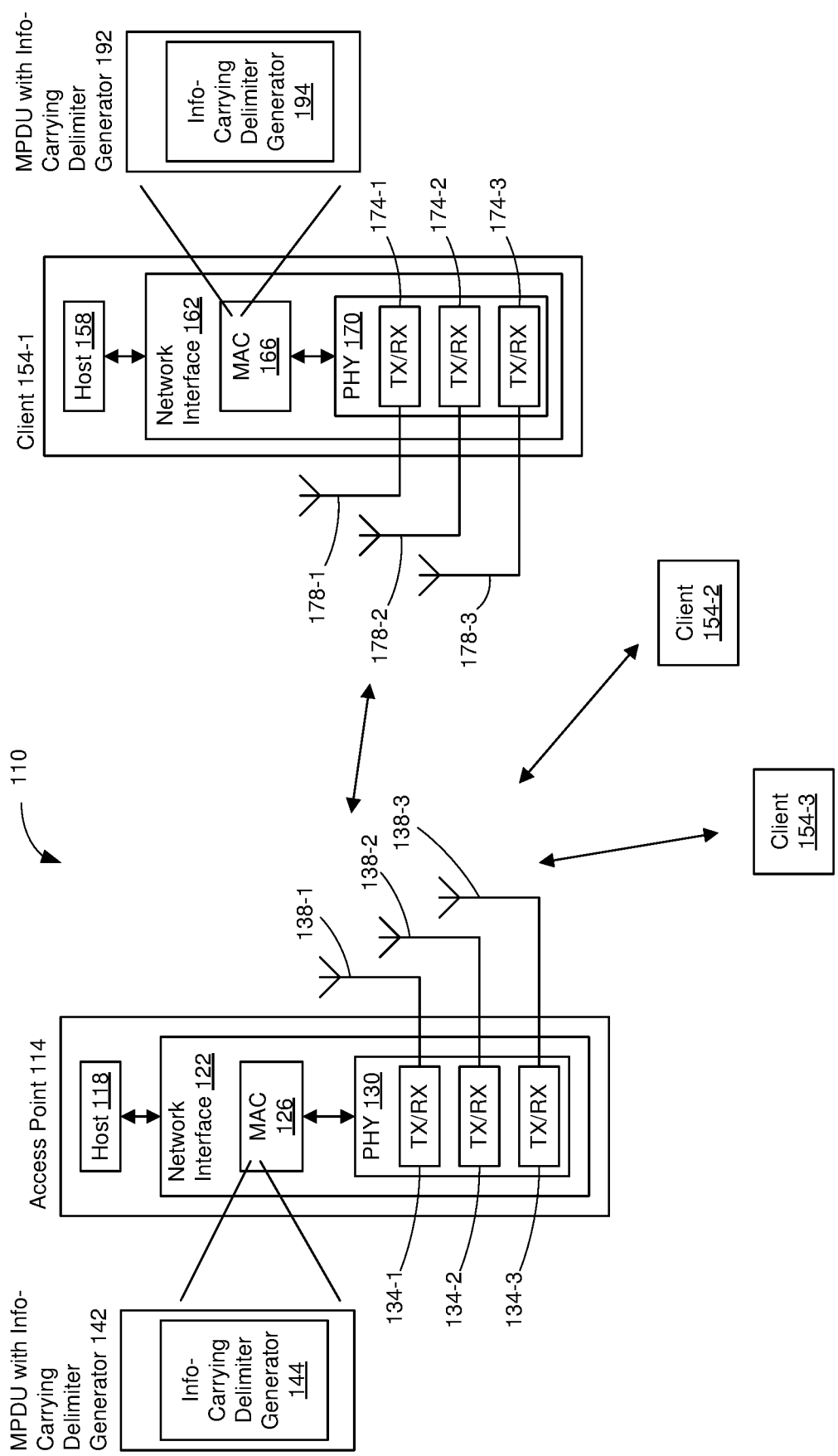
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a MAC processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MPDUs, etc., and provide the MAC layer data units to the PHY processor 130. The PHY processor 130 is configured to receive MAC layer data units from the MAC processor 126 and encapsulate the MAC layer data units to generate PHY data units such as PHY protocol data units (PPDUs) for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the MAC processor 126 includes an MPDU generator 142 that is configured to generate MPDUs that include MPDU delimiter fields having acknowledgement, control, and/or status information, according to an embodiment. For example, the MPDU generator 142 is configured to generate MPDUs such as described herein. In an embodiment, the MPDU generator 142 includes an MPDU delimiter generator 144 that is configured to generate MPDU delimiter fields having acknowledgement, control, and/or status information, according to an embodiment. For example, the MPDU delimiter generator 144 is configured to generate delimiter fields such as described herein.

In an embodiment, the MPDU generator 142 is implemented by a processor configured to execute machine readable instructions stored in a memory device (not shown) such as a RAM, a ROM, a flash memory, etc. In an embodiment, the MPDU generator 142 additionally or alternatively includes a hardware state machine that is configured to generate MPDUs such as described herein. Similarly, the MPDU delimiter generator 144 is implemented by a processor configured to execute machine readable instructions stored in a memory device (not shown) such as a RAM, a ROM, a flash memory, etc. In an embodiment, the MPDU delimiter generator 144 additionally or alternatively includes a hardware state machine that is configured to generate delimiter fields such as described herein.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170. The PHY processor 170 is configured to receive MAC layer data units from the MAC processor 166 and encapsulate the MAC layer data units to generate PHY data units such as PPDUs for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the MAC processor 166 includes an MPDU generator 192 that is configured to generate MPDUs that include MPDU delimiter fields having acknowledgement, control, and/or status information, according to an embodiment. For example, the MPDU generator 192 is configured to generate MPDUs such as described herein. In an embodiment, the MPDU generator 192 includes an MPDU delimiter generator 194 that is configured to generate MPDU delimiter fields having acknowledgement, control, and/or status information, according to an embodiment. For example, the MPDU delimiter generator 194 is configured to generate delimiter fields such as described herein.

In an embodiment, the MPDU generator 142 is implemented by a processor configured to execute machine readable instructions stored in a memory device (not shown) such as a RAM, a ROM, a flash memory, etc. In an embodiment, the MPDU generator 142 additionally or alternatively includes a hardware state machine that is configured to generate MPDUs such as described herein. Similarly, the MPDU delimiter generator 144 is implemented by a processor configured to execute machine readable instructions stored in a memory device (not shown) such as a RAM, a ROM, a flash memory, etc. In an embodiment, the MPDU delimiter generator 144 additionally or alternatively includes a hardware state machine that is configured to generate delimiter fields such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
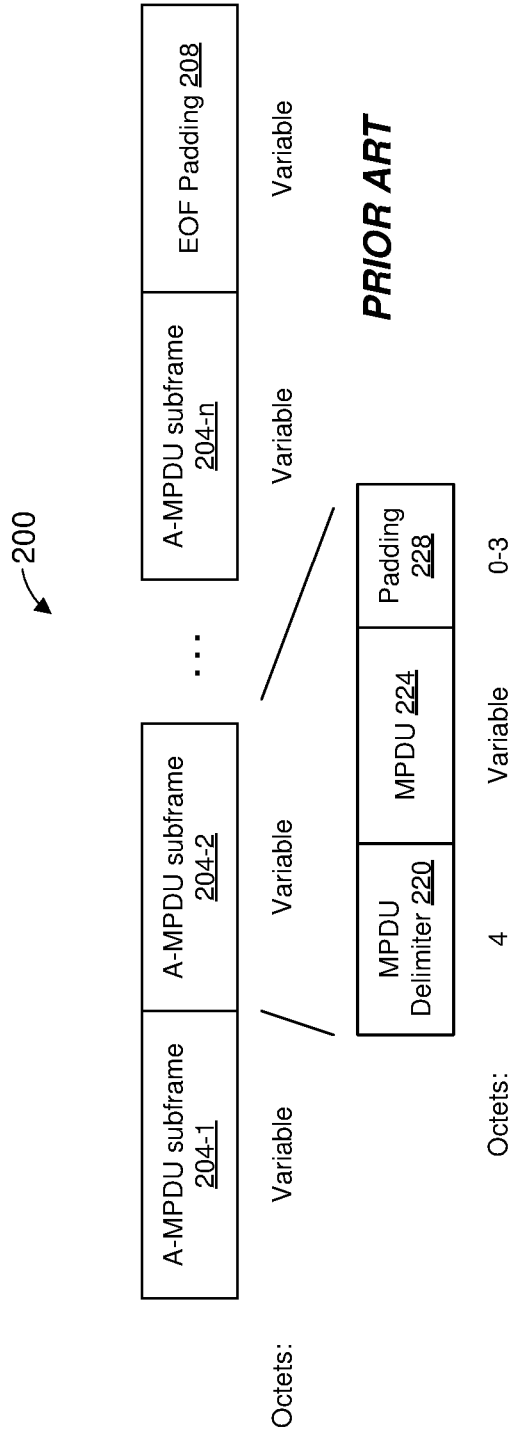
FIG. 2A is a diagram of a prior aggregate media access control (MAC) protocol data unit (A-MPDU).

FIG. 2A is a diagram of a prior art aggregate MPDU (A-MPDU) 200. The A-MPDU 200 includes one or more MPDUs in one or more respective A-MPDU subframes 204. If the A-MPDU 200 includes only a single MPDU, the A-MPDU subframe 204 that includes the single MPDU is sometimes referred to as an "S-MPDU".

Each A-MPDU subframe 204 includes an MPDU delimiter field 220, an MPDU 224, and optionally a padding field 228. The MPDU delimiter field 220 facilitates a receiver device distinguishing between different A-MPDU subframes 204 when processing the A-MPDU 200. For example, as will be discussed below, the MPDU delimiter field 220 includes a predetermined bit pattern, or signature, that facilitates a receiver device detecting delimiter fields 220 when scanning a bit stream corresponding to the A-MPDU 200.

When the A-MPDU 200 includes multiple MPDUs, the optional padding field 228 includes padding bits that are used to facilitate processing of the multiple MPDUs by providing additional processing time between MPDUs and/or to adjust a length of the A-MPDU 200 to a desired length. In a last-occurring A-MPDU subframe 204 in the A-MPDU 200, padding bits in the optional padding field 228 facilitate processing of last-occurring MPDU by providing additional time before an end of the A-MPDU.

Figure 2B:
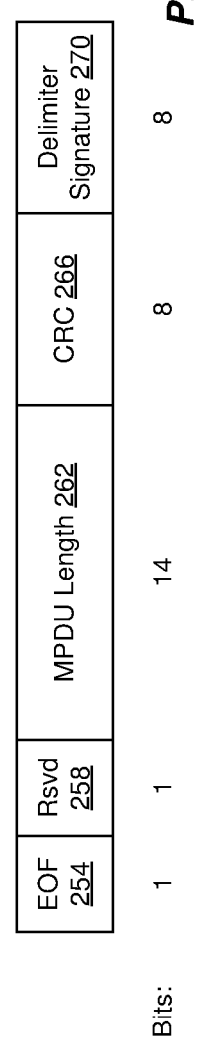
FIG. 2B is a diagram of a prior art MPDU delimiter used in the prior art A-MPDU of FIG. 2A.

FIG. 2B is a diagram of a prior art aggregate MPDU delimiter field 250 that is used as the MPDU delimiter field 220 of FIG. 2A. The MPDU delimiter field 250 includes: an end of file (EOF) subfield 254, a reserved subfield 258, an MPDU length subfield 262, a cyclic redundancy check (CRC) subfield 266, and a delimiter signature subfield 270. The EOF subfield 254 is set to indicate whether the A-MPDU subframe 204 in which the delimiter field 250 is present is the last-occurring A-MPDU subframe 204 in the A-MPDU 200. The reserved subfield 258 is set to a predetermined value (e.g., zero) and is ignored by the receiver. The MPDU length subfield 262 is set to indicate a length of the MPDU to which the MPDU delimiter field 250 corresponds. The CRC subfield 266 includes error detection information to facilitate a receiver to detect errors in the MPDU delimiter field 250, when received. The delimiter signature subfield 270 includes the predetermined bit pattern, or signature, to facilitate detection of the delimiter field 250 by a receiver device when scanning a bit stream corresponding to the A-MPDU 200.

A prior art MPDU, such as may be included in the A-MPDU 200 of FIG. 2A, comprises a MAC header having several bytes of information, such as a frame control field that indicates a format of the MPDU, a duration field that indicates a time duration of the MPDU, one or more address fields that identify an intended recipient of the MPDU and optionally a transmitter of the MPDU, a frame check sequence (FCS) field that provides error detection information for indicating whether the MAC header, as received, includes any errors, etc. Typically, a receiver of a prior art MPDU analyzes a receiver address field in a MAC header of the received MPDU to determine if the MPDU is intended for the receiver. In some cases, however, a PHY header of a PHY data unit includes sufficient information for a receiver to deduce whether an MPDU in the PHY data unit is intended for the receiver, as will be discussed below. Additionally, in some cases, not all of the information in the MAC header is needed by the receiver. Thus, as will be discussed in more detail below, feedback information is transmitted within an MPDU delimiter rather than within an MPDU (i.e., an MPDU with a MAC header is not transmitted), and needed information typically included in a MAC header is deduced using information in a PHY header of a PHY data unit that includes the MPDU delimiter, for example. Because the MPDU delimiter has a shorter duration than an MPDU with a MAC header, overhead is reduced and/or throughput is increased in a wireless communication network, at least in some embodiments.

Figure 3:
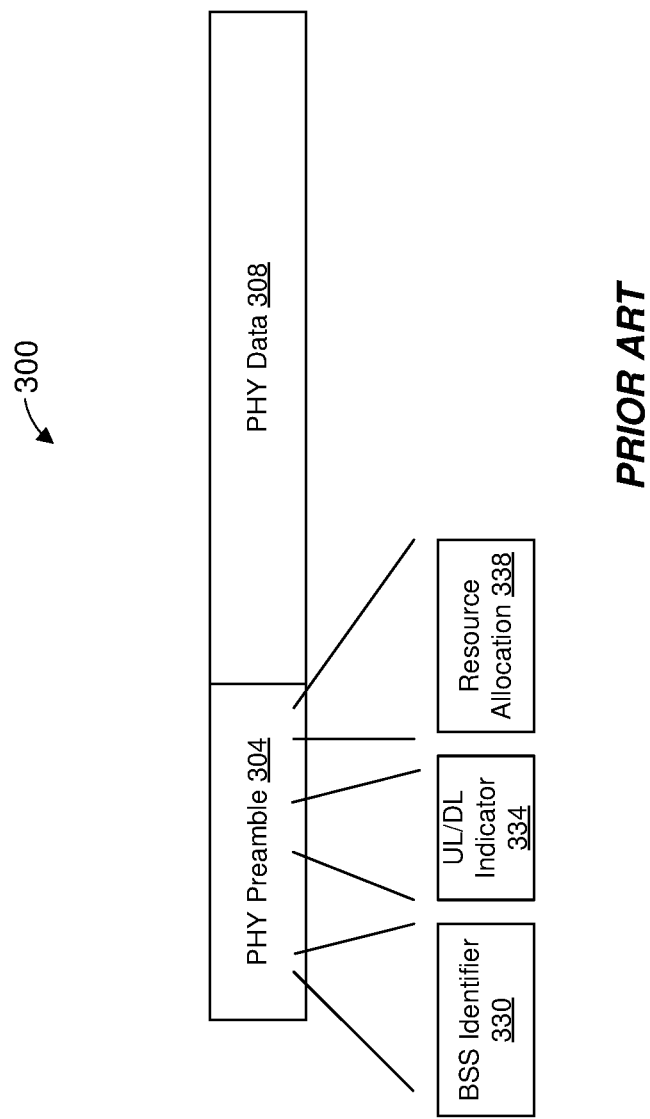
FIG. 3 is a diagram of an example prior art physical layer (PHY) data unit.

FIG. 3 is a diagram of a prior art PHY data unit 300. The PHY data unit 300 includes a PHY preamble 304 and a PHY data portion 308. The PHY preamble 304 includes training signals and one or more signal fields. The one or more signal fields generally include information that a receiver device uses to process the PHY data unit 300. For example, the one or more signal fields of the PHY preamble 304 include basic service set (BSS) identification information 330, such as a MAC address of the AP 114 (which may also serve as a BSS identifier (ID), a BSS color ID, etc. The BSS identification information 330 identifies the AP as either the transmitter or the intended receiver of the PHY data unit 300.

The one or more signal fields of PHY preamble 304 also include an uplink/downlink (UL/DL) indicator 334. The UL/DL indicator 334 indicates whether the PHY data unit 300 is being transmitted by the AP 114 to one or more client stations 154 (DL), or whether the PHY data unit 300 is being transmitted to the AP 114 from a client station 154 (UL).

The BSS identification information 330 and the UL/DL indicator 334 together indicate i) the AP 114 is the intended receiver if the PHY data unit 300 is transmitted in the UL, and ii) the AP 114 is the transmitter if the PHY data unit 300 is transmitted in the DL.

If the PHY data unit 300 is a DL multi-user (MU) PHY data unit, the one or more signal fields of PHY preamble 304 also include resource allocation information 338. The resource allocation information 338 indicates frequency resource and/or spatial stream(s) assigned to each of multiple client stations 154, and via which respective information in the PHY data portion 308 is being transmitted to the client stations 154. Thus, if a client station 154 receives information in the PHY data portion 308 via resources (frequency and/or spatial stream) allocated to the client station 154, the client station can assume that the client station is the intended receiver of such information.

If the PHY data unit 300 is an UL multi-user (MU) PHY data unit, the UL PHY data unit 300 is transmitted in response to a previously transmitted trigger frame from the AP 114, which includes resource allocation information for the UL PHY data unit 300. The resource allocation information indicates frequency resource and/or spatial stream(s) assigned to each of multiple client stations 154, and via which respective the client stations 154 are to transmit as part of the UL PHY data unit 300. Thus, if the AP 114 receives information in the PHY data portion 308 via resources (frequency and/or spatial stream) allocated to a particular client station 154, the AP 114 can assume that the particular client station 154 is the transmitter of such information.

If the PHY data unit 300 is a trigger-based UL PHY data unit from a single client station 154, the UL PHY data unit 300 is transmitted in response to a previously transmitted trigger frame from the AP 114. If the AP 114 receives the PHY data unit 300 in response to the previously transmitted trigger frame to a particular client station 154, the AP 114 can assume that the particular client station 154 is the transmitter of the PHY data unit 300.

In some instances, the PHY data unit 300 includes acknowledgment information for acknowledging receipt of a previously transmitted MPDU. If the AP 114 transmits an MPDU to a particular client station 154 and then receives the PHY data unit 300 (which includes acknowledgement information) at a time when the AP 114 is expecting an acknowledgment of the MPDU, the AP 114 can assume that the particular client station 154 is the transmitter of the PHY data unit 300 at least if information in the PHY preamble 304 is consistent with the assumption (e.g., the BSS identification information 330 identifies the AP 114 and optionally the UL/DL indicator 334 indicates an UL transmission).

Similarly, in some instances, the PHY data unit 300 includes control and/or status information that is transmitted in response to a request for such control and/or status information. If the AP 114 transmits a request for control and/or status information to a particular client station 154 and then receives the PHY data unit 300 (which includes the requested control and/or status information) at a time when the AP 114 is expecting a response to the request, the AP 114 can assume that the particular client station 154 is the transmitter of the PHY data unit 300 at least if information in the PHY preamble 304 is consistent with the assumption (e.g., the BSS identification information 330 identifies the AP 114 and optionally the UL/DL indicator 334 indicates an UL transmission).

In embodiments described below, a wireless communication device transmits acknowledgement, control, and/or status information in a manner that permits omission of an MPDU with a MAC header. In some embodiments, omission of the MPDU with a MAC header is permitted because the wireless communication device can assume that the wireless communication device is the intended recipient based on i) information in a PHY header of a PHY data unit that includes the acknowledgement, control, and/or status information, and/or ii) timing of receipt of the PHY data unit. Similarly, in some embodiments, omission of the MPDU with a MAC header is permitted also because the wireless communication device can assume an identity of a transmitter of the PHY data unit based on i) information in the PHY header, and/or ii) timing of receipt of the PHY data unit. In other words, with transmission of acknowledgement, control, and/or status information such as discussed below, information in the MAC header is not needed and/or needed information in a typical MAC header can be deduced by the wireless communication device using information in the PHY header and/or timing of receipt of the PHY data unit, according to some embodiments.

In embodiments described below, the acknowledgement, control, and/or status information is included in an MPDU delimiter field. In some embodiments, because the MPDU delimiter field is shorter than an MPDU with a MAC header, overall system throughput is improved.

Figure 4:
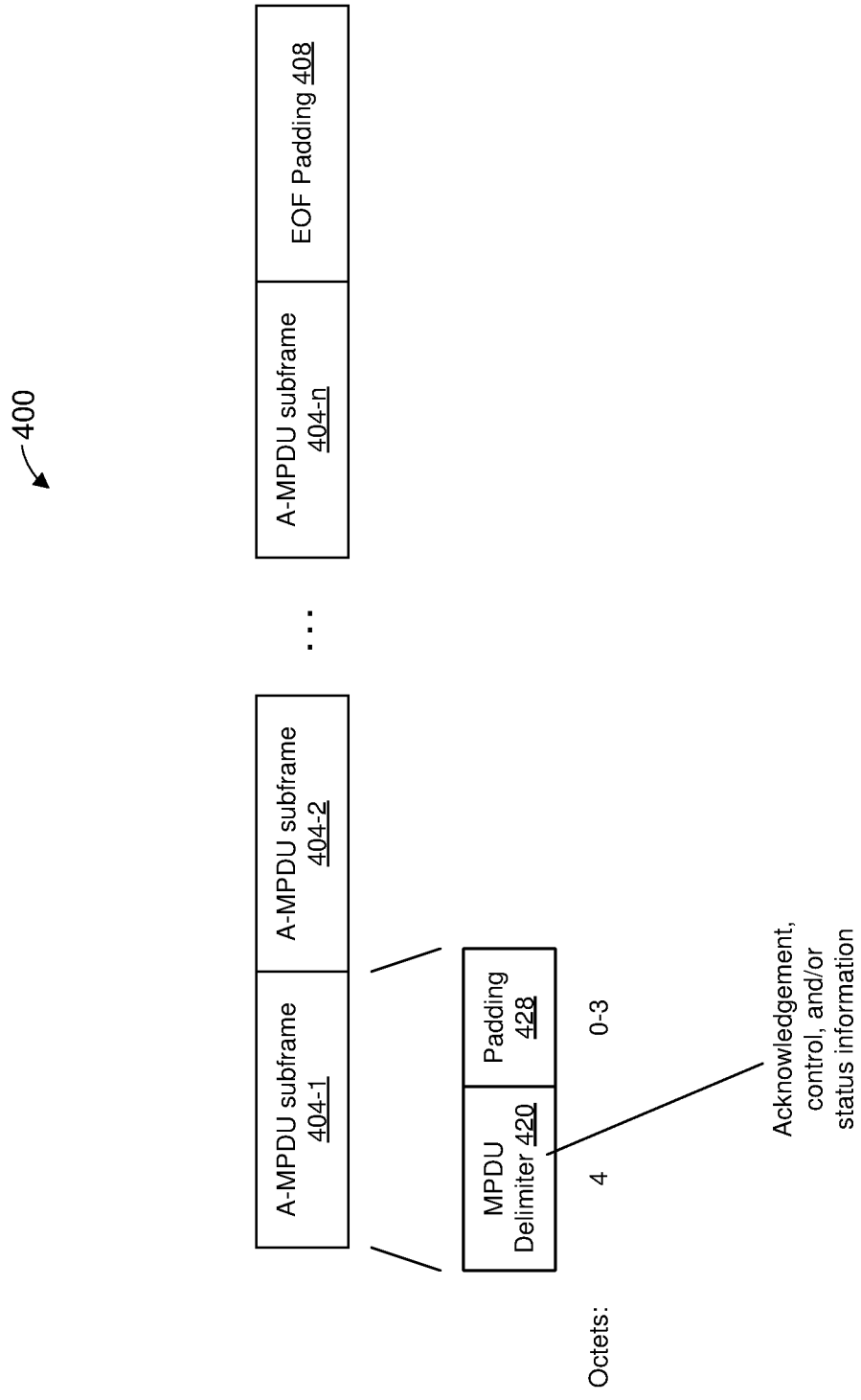
FIG. 4 is a diagram an example A-MPDU in which acknowledgement, control, and/or status information is included in an MPDU delimiter (different from the prior art MPDU delimiter of FIG. 2B) within the A-MPDU, according to an embodiment.

FIG. 4 is a diagram of an example MAC data unit 400, sometimes referred to as the aggregate MPDU (A-MPDU) 400, according to an embodiment. The A-MPDU 400 is used to transmit acknowledgement, control, and/or status information, according to an embodiment. In an embodiment, the network interface device 122 is configured to (e.g., the MAC processor 126 is configured to, the MPDU generator 142 is configured to, etc.) generate the A-MPDU 400. In another embodiment, the network interface device 162 is configured to (e.g., the MAC processor 166 is configured to, the MPDU generator 192 is configured to, etc.) generate the A-MPDU 400. In other embodiments, another suitable communication device generates the A-MPDU 400.

The A-MPDU 400 includes one or more A-MPDU subframes 404, and optionally a padding field 408. In an embodiment, none of the A-MPDU subframes 404 includes an MPDU, i.e., the A-MPDU 400 omits MPDUs.

At least one A-MPDU subframe 404 includes an MPDU delimiter field 420 that includes acknowledgement, control, and/or status information. In an embodiment, the A-MPDU subframe 404 does not include any MPDUs, i.e., the A-MPDU subframe 404 omits MPDUs. Optionally, the A-MPDU subframe 404 includes a padding field 428.

In an embodiment, the A-MPDU 400 is transmitted in a PHY data unit such as the PHY data unit discussed with reference to FIG. 3. For example, the A-MPDU 400 is included in the PHY data portion 308, according to an embodiment.

Figure 5A:
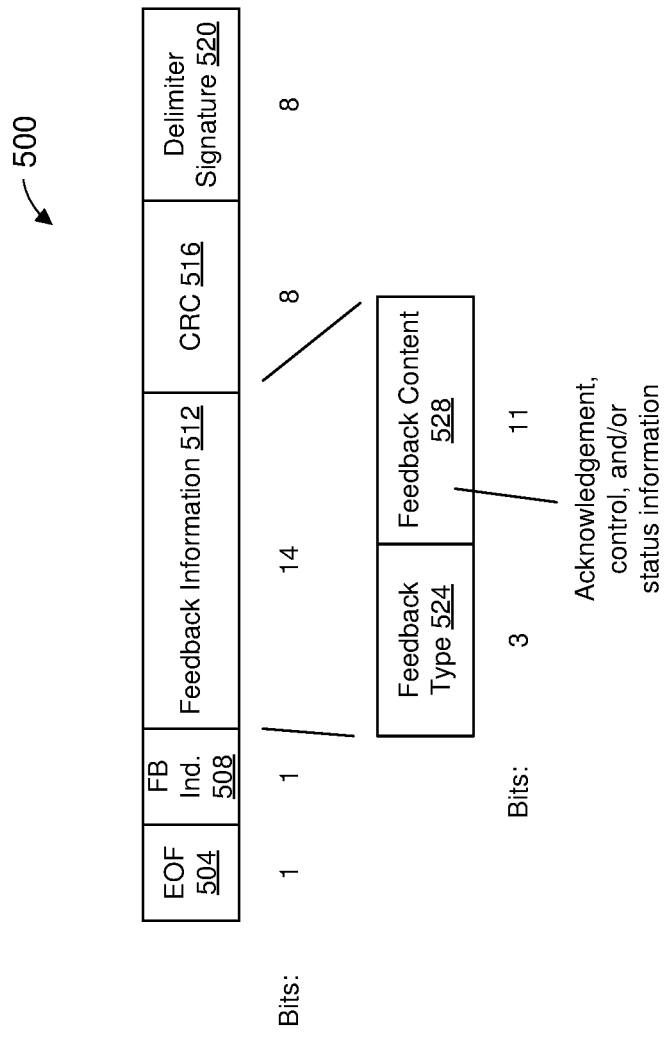
FIG. 5A is a diagram of an example MPDU delimiter that is included in the example A-MPDU of FIG. 4, the MPDU delimiter comprising acknowledgement, control, and/or status information, according to an embodiment.

FIG. 5A is a diagram of an example MPDU delimiter field 500 that includes acknowledgement, control, and/or status information, according to an embodiment. In an embodiment, the network interface device 122 is configured to (e.g., the MAC processor 126 is configured to, the MPDU generator 142 is configured to, the MPDU delimiter generator 144 is configured to, etc.) generate the MPDU delimiter field 500. In another embodiment, the network interface device 162 is configured to (e.g., the MAC processor 166 is configured to, the MPDU generator 192 is configured to, the MPDU delimiter generator 194 is configured to, etc.) generate the MPDU delimiter field 500. In other embodiments, another suitable communication device generates the MPDU delimiter field 500.

In some embodiments, the MPDU delimiter field 500 is included in one or more of the A-MPDU subframes 404 of FIG. 4, and FIG. 5A is described with reference to FIG. 4 for explanatory purposes. In other embodiments, the MPDU delimiter field 500 is included in another suitable MAC data unit.

Although FIG. 5A illustrates an example ordering of subfields within the MPDU delimiter field 500, and indicates example lengths of subfields within the MPDU delimiter field 500, in other embodiments the ordering of subfields within the MPDU delimiter field 500 is suitably different, and/or the lengths of subfields within the MPDU delimiter field 500 are suitably different. In other embodiments, one or more of subfields illustrated in FIG. 5A are omitted, and/or one or more additional suitable subfields are included.

The MPDU delimiter field 500 includes: an EOF subfield 504, a feedback indicator subfield 508, a feedback information subfield 512, a CRC subfield 516, and a delimiter signature subfield 520. The EOF subfield 254 is set to indicate whether the A-MPDU subframe 404 in which the delimiter field 500 is present is the last-occurring A-MPDU subframe 404 in the A-MPDU 400.

The feedback indicator subfield 508 is set to a value to indicate that the MPDU delimiter field 500 includes feedback information (e.g., acknowledgement, control, and/or status information), according to an embodiment. Comparing the MPDU delimiter field 500 with the prior art MPDU delimiter field 250 of FIG. 2B, the feedback indicator subfield 508 is in a same bit position within the MPDU delimiter field 500 as a bit position of the reserved subfield 258 in the prior art MPDU delimiter field 250, according to an embodiment. In the prior art MPDU delimiter field 250, the reserved subfield 258 is set to a predetermined value (e.g., zero); on the other hand, the feedback indicator subfield 508 is set to a value (e.g., one) different than the predetermined value to indicate that the MPDU delimiter field 500 includes feedback information (e.g., acknowledgement, control, and/or status information) and to distinguish the MPDU delimiter field 500 from the prior art MPDU delimiter field 250, according to an embodiment.

Comparing the MPDU delimiter field 500 with the prior art MPDU delimiter field 250 of FIG. 2B, the feedback information subfield 512 is in a same bit position within the MPDU delimiter field 500 as a bit position of the MPDU length subfield 262 in the prior art MPDU delimiter field 250, according to an embodiment. Thus, the feedback indicator subfield 508 is set to a value (e.g., one) to indicate that the MPDU delimiter field 500 includes the feedback information subfield 512 rather than the MPDU length subfield 262 as in the prior art MPDU delimiter field 250, according to an embodiment.

The CRC subfield 516 includes error detection information to facilitate a receiver to detect errors in the MPDU delimiter field 500, when received. The delimiter signature subfield 520 includes the predetermined bit pattern, or signature, of an MPDU delimiter to facilitate detection of the delimiter field 500 by a receiver device when scanning a bit stream corresponding to the A-MPDU 400.

The feedback information subfield 512 includes a feedback type subfield 524 and a feedback content subfield 528. In an embodiment, different types of information can be included in the feedback content subfield 528, and the feedback type subfield 524 is set to a value that indicates a type of feedback information in the feedback content subfield 528. As merely an illustrative example, a plurality of different types of information that can be included in the feedback content subfield 528 includes two or more of: i) acknowledgement information, ii) buffer status information, iii) the bandwidth status information, and iv) station readiness information. If the feedback content subfield 528 includes acknowledgement information, the feedback type subfield 524 is set to a value to indicate that the feedback content subfield 528 includes acknowledgement information, according to an embodiment. If the feedback content subfield 528 includes bandwidth status information, the feedback type subfield 524 is set to a value to indicate that the feedback content subfield 528 includes bandwidth status information, according to an embodiment. If the feedback content subfield 528 includes buffer status information, the feedback type subfield 524 is set to a value to indicate that the feedback content subfield 528 includes buffer status information, according to an embodiment.

In an embodiment in which frames (to be transmitted) corresponding to different traffic identifiers (IDs) are stored in respective buffers, if the feedback content subfield 528 includes buffer status information for a particular traffic identifier (TID), the feedback type subfield 524 is set to a value to indicate that the feedback content subfield 528 includes buffer status information for the particular TID.

In another embodiment, the feedback information subfield 512 does not include the feedback type subfield 524, and the feedback content subfield 528 is larger (e.g., includes 12 bits, 13, bits, 14 bits, etc.). For example, an MPDU (e.g., a trigger frame, an MPDU to be acknowledged, etc.) that prompts transmission of the MPDU delimiter field 500 specifies the type of information to be included in the feedback information subfield 512, and the information included in the feedback information subfield 512 is consistent with the specified type of feedback.

Figure 5B:
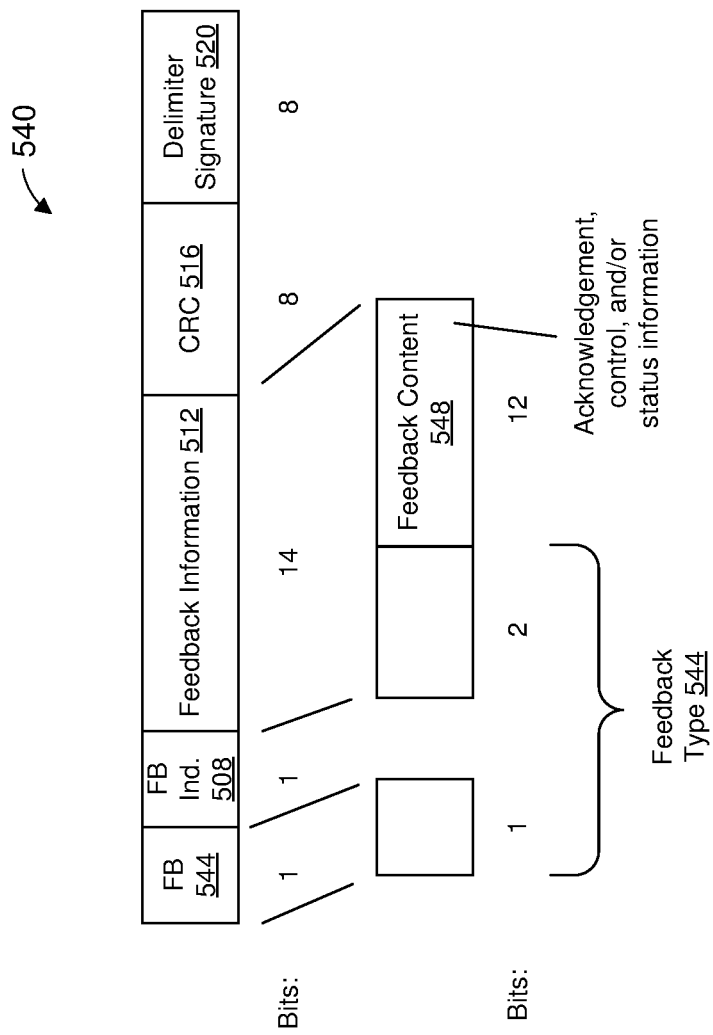
FIG. 5B is a diagram of another example MPDU delimiter that includes acknowledgement, control, and/or status information, the MPDU delimiter being an alternative to the MPDU delimiter of FIG. 5A, according to another embodiment.

FIG. 5B is a diagram of another example MPDU delimiter field 540 that includes acknowledgement, control, and/or status information, according to an embodiment. In an embodiment, the network interface device 122 is configured to (e.g., the MAC processor 126 is configured to, the MPDU generator 142 is configured to, the MPDU delimiter generator 144 is configured to, etc.) generate the MPDU delimiter field 540. In another embodiment, the network interface device 162 is configured to (e.g., the MAC processor 166 is configured to, the MPDU generator 192 is configured to, the MPDU delimiter generator 194 is configured to, etc.) generate the MPDU delimiter field 540. In other embodiments, another suitable communication device generates the MPDU delimiter field 540.

In some embodiments, the MPDU delimiter field 540 is included in one or more of the A-MPDU subframes 404 of FIG. 4. In other embodiments, the MPDU delimiter field 540 is included in another suitable MAC data unit.

Although FIG. 5B illustrates an example ordering of subfields within the MPDU delimiter field 540, and indicates example lengths of subfields within the MPDU delimiter field 540, in other embodiments the ordering of subfields within the MPDU delimiter field 540 is suitably different, and/or the lengths of subfields within the MPDU delimiter field 540 are suitably different. In other embodiments, one or more of subfields illustrated in FIG. 5B are omitted, and/or one or more additional suitable subfields are included.

The MPDU delimiter field 540 is similar to the MPDU delimiter field 500 of FIG. 5A, and like-numbered elements are not described in detail for purposes of brevity.

Unlike the MPDU delimiter field 500, the MPDU delimiter field 540 does not include the EOF subfield 504. Rather, a bit in the same bit position within the MPDU delimiter field 540 as the bit position of the EOF subfield 504 within the MPDU delimiter field 500 is used as part of a feedback type subfield 544. Additionally, two bits of the feedback information subfield 512 are used as another part of the feedback type subfield 544. The feedback information subfield 512 includes a feedback content subfield 548 that includes 12 bits (as compared to 11 bits in the MPDU delimiter field 500 of FIG. 5A).

Figure 5C:
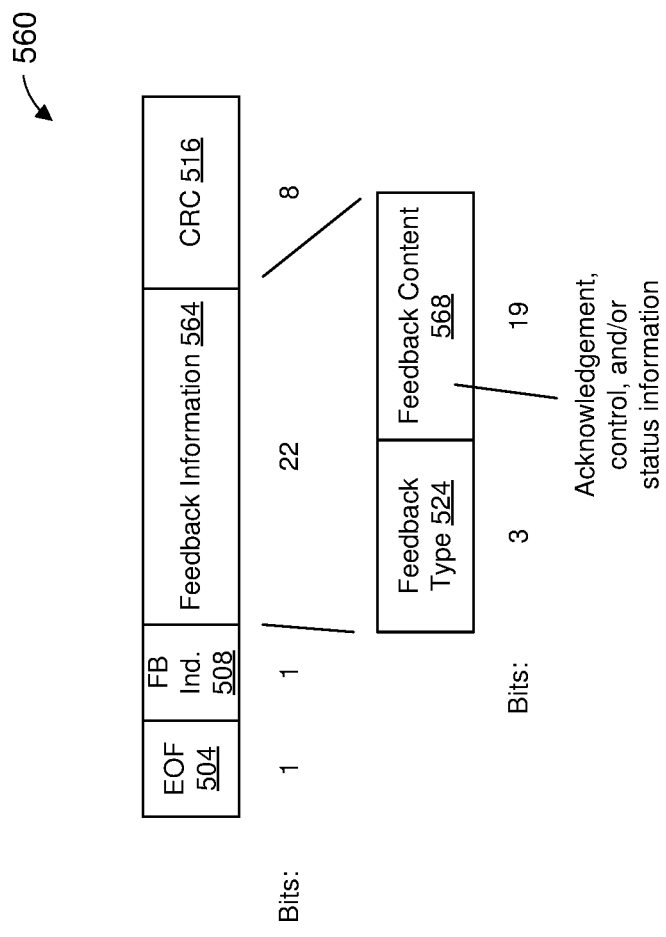
FIG. 5C is a diagram of another example MPDU delimiter that includes acknowledgement, control, and/or status information, the MPDU delimiter being an alternative to the MPDU delimiters of FIGS. 5A-B, according to another embodiment.

FIG. 5C is a diagram of another example MPDU delimiter field 560 that includes acknowledgement, control, and/or status information, according to an embodiment. In an embodiment, the network interface device 122 is configured to (e.g., the MAC processor 126 is configured to, the MPDU generator 142 is configured to, the MPDU delimiter generator 144 is configured to, etc.) generate the MPDU delimiter field 560. In another embodiment, the network interface device 162 is configured to (e.g., the MAC processor 166 is configured to, the MPDU generator 192 is configured to, the MPDU delimiter generator 194 is configured to, etc.) generate the MPDU delimiter field 560. In other embodiments, another suitable communication device generates the MPDU delimiter field 560.

In some embodiments, the MPDU delimiter field 560 is included in one or more of the A-MPDU subframes 404 of FIG. 4. In other embodiments, the MPDU delimiter field 560 is included in another suitable MAC data unit.

Although FIG. 5C illustrates an example ordering of subfields within the MPDU delimiter field 560, and indicates example lengths of subfields within the MPDU delimiter field 560, in other embodiments the ordering of subfields within the MPDU delimiter field 560 is suitably different, and/or the lengths of subfields within the MPDU delimiter field 560 are suitably different. In other embodiments, one or more of subfields illustrated in FIG. 5C are omitted, and/or one or more additional suitable subfields are included.

The MPDU delimiter field 560 is similar to the MPDU delimiter field 500 of FIG. 5A, and like-numbered elements are not described in detail for purposes of brevity.

Unlike the MPDU delimiter field 500, the MPDU delimiter field 560 does not include the delimiter signature subfield 520. Additionally, a feedback information subfield 564 includes more bits as compared to the feedback information field 512 of FIG. 5A. Additionally, a feedback content subfield 568 includes more bits as compared to the feedback content subfield 528 of FIG. 5A.

Figure 5D:
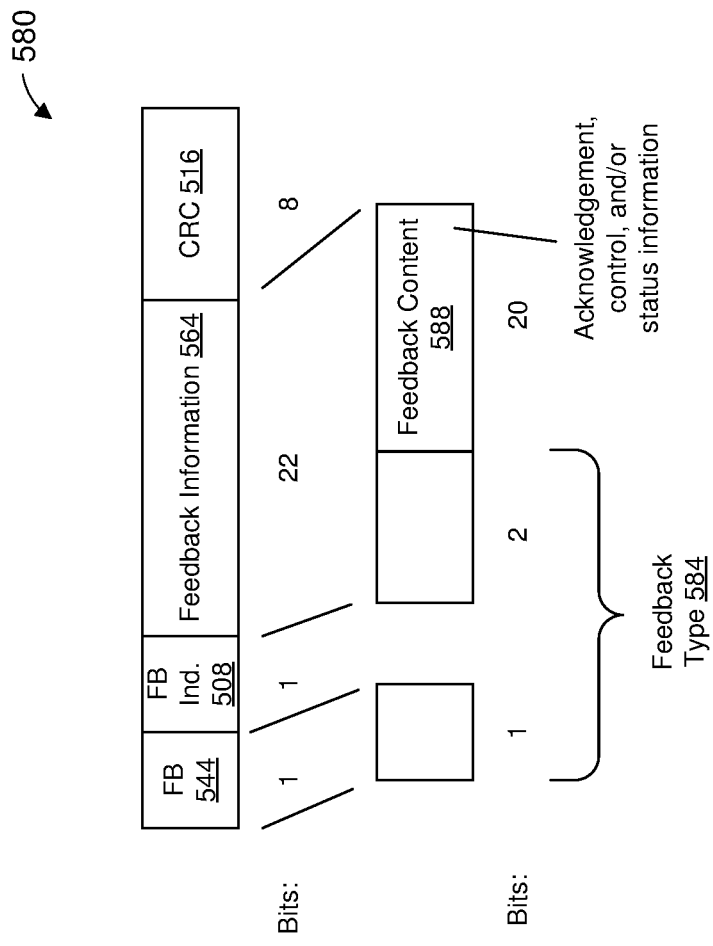
FIG. 5D is a diagram of another example MPDU delimiter that includes acknowledgement, control, and/or status information, the MPDU delimiter being an alternative to the MPDU delimiters of FIGS. 5A-C, according to another embodiment.

FIG. 5D is a diagram of another example MPDU delimiter field 580 that includes acknowledgement, control, and/or status information, according to an embodiment. In an embodiment, the network interface device 122 is configured to (e.g., the MAC processor 126 is configured to, the MPDU generator 142 is configured to, the MPDU delimiter generator 144 is configured to, etc.) generate the MPDU delimiter field 580. In another embodiment, the network interface device 162 is configured to (e.g., the MAC processor 166 is configured to, the MPDU generator 192 is configured to, the MPDU delimiter generator 194 is configured to, etc.) generate the MPDU delimiter field 580. In other embodiments, another suitable communication device generates the MPDU delimiter field 580.

In some embodiments, the MPDU delimiter field 580 is included in one or more of the A-MPDU subframes 404 of FIG. 4. In other embodiments, the MPDU delimiter field 580 is included in another suitable MAC data unit.

Although FIG. 5D illustrates an example ordering of subfields within the MPDU delimiter field 580, and indicates example lengths of subfields within the MPDU delimiter field 580, in other embodiments the ordering of subfields within the MPDU delimiter field 580 is suitably different, and/or the lengths of subfields within the MPDU delimiter field 580 are suitably different. In other embodiments, one or more of subfields illustrated in FIG. 5D are omitted, and/or one or more additional suitable subfields are included.

The MPDU delimiter field 580 is similar to the MPDU delimiter field 560 of FIG. 5C, and like-numbered elements are not described in detail for purposes of brevity.

Unlike the MPDU delimiter field 560, the MPDU delimiter field 580 does not include the EOF subfield 504. Rather, a bit in the same bit position within the MPDU delimiter field 580 as the bit position of the EOF subfield 504 within the MPDU delimiter field 560 is used as part of a feedback type subfield 584. Additionally, two bits of the feedback information subfield 564 are used as another part of the feedback type subfield 584. The feedback information subfield 564 includes a feedback content subfield 588 that includes 20 bits (as compared to 19 bits in the MPDU delimiter field 560 of FIG. 5C).

Referring again to FIG. 4, in some embodiments, multiple A-MPDU subframes 404 include respective MPDU delimiters 420 that includes acknowledgement, control, and/or status information. In some embodiments, at least two A-MPDU subframes 404 include respective MPDU delimiters 420 that include different acknowledgement, control, and/or status information. As an illustrative example, respective MPDU delimiters 420 include respective buffer status information for respective TIDs, in an embodiment.

In some embodiments, at least two A-MPDU subframes 404 include respective MPDU delimiters 420 that include the same acknowledgement, control, and/or status information. For example, to pad the A-MPDU 404 to a desired length, multiple MPDU delimiters 420 with the same information are included in the A-MPDU 404, according to an embodiment. Additionally or alternatively, in order to pad the A-MPDU 404 to the desired length, one or more of the A-MPDU subframes 404 are used for padding and correspond to prior art A-MPDU subframes that omit MPDUs and that include prior art MPDU delimiters (e.g., such as the MPDU delimiter 250 of FIG. 2B) with the MPDU length field 262 set to zero to indicate that an MPDU is omitted and with the EOF subfield 254 set to one. Additionally or alternatively, in order to pad the A-MPDU 404 to the desired length, padding bits are included in the EOF padding field 408.

Figure 6:
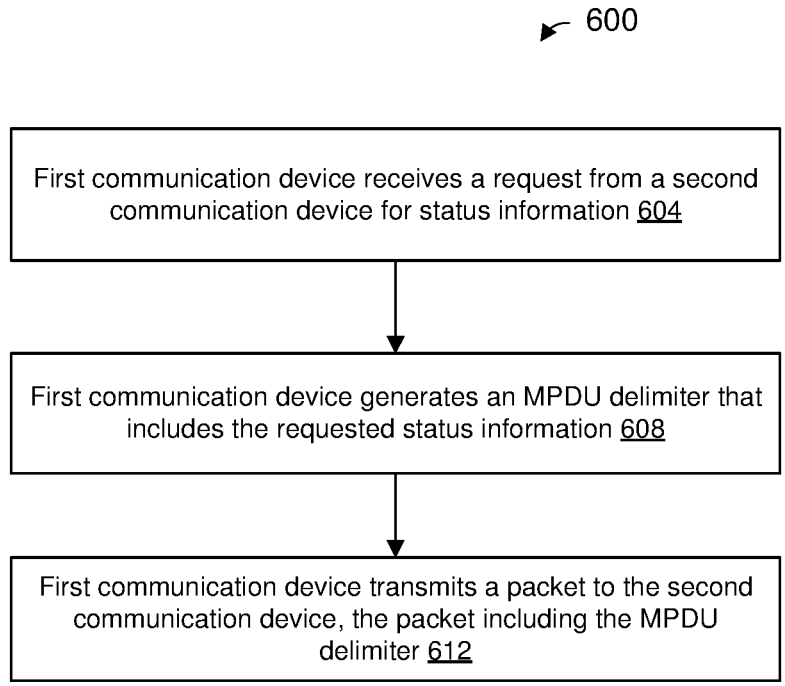
FIG. 6 is a flow diagram of an example method for providing status information in a communication network using an MPDU delimiter such as the MPDU delimiters of FIGS. 5A-D, according to an embodiment.

FIG. 6 is a flow diagram of an example method 600 for providing status information in a communication network, according to an embodiment. In some embodiments, the network interface device 122 and/or the network interface 162 of FIG. 1 is configured to implement the method 600, and the method 600 is described with reference to FIG. 1 for explanatory purposes. In other embodiments, the method 600 is implemented by another suitable communication device.

At block 604, a first communication device receives (e.g., the AP 114 receives, the network interface device 122 receives, the client station 154 receives, the network interface device 162 receives, etc.) a request from a second communication device for status information regarding the first communication device. For example, the request is for bandwidth status information, e.g., status information regarding communication channels or subchannels that are idle from the standpoint of the first communication device and/or are busy from the standpoint of the first communication device, according to an embodiment. As another example, the request is for buffer status information, e.g., status information regarding an amount of data for transmission that is buffered at the first communication device, according to an embodiment. As another example, the request is for buffer status information regarding a particular traffic class, traffic category, etc., of data, e.g., status information regarding an amount of data of a particular TID that is buffered at the first communication device, according to an embodiment. As another example, the request is for station readiness information regarding whether the first communication device is ready to one or more of: receive packets, transmit packets, participate in a procedure (such as a ranging measurement procedure, a channel measurement procedure, etc.) provide requested information, etc., according to an embodiment. As yet another example, the request is for acknowledgement information regarding a MAC data unit transmitted by the second communication device to the first communication device, according to an embodiment.

In an embodiment, the request is received in a trigger frame from the second communication device, the trigger frame being configured to prompt the first communication device to transmit a responsive packet a defined time period (e.g., a short interframe space (SIFS) as defined by the IEEE Standard, or another suitable time period).

At block 608, in response to receiving the request at block 604, the first communication device generates an MPDU delimiter having a feedback indication field and a feedback content field. In an embodiment, generating the MPDU delimiter at block 608 includes: generating the feedback indication field to include a first value that indicates the MPDU delimiter includes the feedback content field rather than an MPDU length field corresponding to a second value of the feedback indication field, and generating the feedback content field to include requested status information regarding the first communication device. In various embodiments, generating the MPDU delimiter at block 608 includes generating an MPDU delimiter as described above with reference to any of FIGS. 5A-D. In other embodiments, generating the MPDU delimiter at block 608 includes generating an MPDU delimiter having a suitable format different than the formats described above with reference to FIGS. 5A-D.

In another embodiment, generating the MPDU delimiter at block 608 further comprises: generating the MPDU delimiter to further include a feedback type field to include an indication of a type of content in the feedback content field, wherein the type of content is selected from a plurality of different types of content. In an embodiment, the plurality of different types of content comprises at least two of: i) buffer status information, ii) channel availability information, iii) station readiness information, and iv) acknowledgment information.

In another embodiment, generating the MPDU delimiter at block 608 further comprises: generating the MPDU delimiter to further include a delimiter signature field, the delimiter field having a predefined bit pattern for detection, at the second communication device, of the MPDU delimiter.

At block 612, in response to receiving the request at block 604, the first communication device transmits a packet that includes the MPDU delimiter generated at block 608. In an embodiment, the packet has a format the same as or similar to the PHY data unit discussed with reference to FIG. 3. In an embodiment, the MPDU delimiter is included in an A-MPDU having a format the same as or similar to the A-MPDU discussed with reference to FIG. 4.

Figure 7:
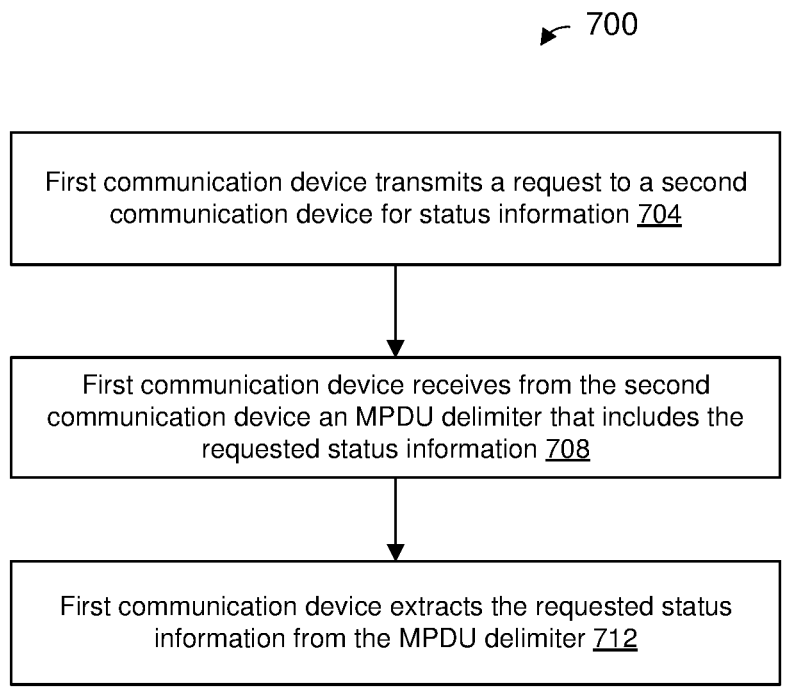
FIG. 7 is a flow diagram of an example method for obtaining status information in a communication network using an MPDU delimiter such as the MPDU delimiters of FIGS. 5A-D, according to an embodiment.

FIG. 7 is a flow diagram of an example method 700 for obtaining status information in a communication network, according to an embodiment. In some embodiments, the network interface device 122 and/or the network interface 162 of FIG. 1 is configured to implement the method 700, and the method 700 is described with reference to FIG. 1 for explanatory purposes. In other embodiments, the method 700 is implemented by another suitable communication device.

At block 704, a first communication device transmits (e.g., the AP 114 transmits, the network interface device 122 transmits, the client station 154 transmits, the network interface device 162 transmits, etc.) to a second communication device a request for status information regarding the second communication device. For example, the request is for bandwidth status information, e.g., status information regarding communication channels or subchannels that are idle from the standpoint of the second communication device and/or are busy from the standpoint of the first communication device, according to an embodiment. As another example, the request is for buffer status information, e.g., status information regarding an amount of data for transmission that is buffered at the second communication device, according to an embodiment. As another example, the request is for buffer status information regarding a particular traffic class, traffic category, etc., of data, e.g., status information regarding an amount of data of a particular TID that is buffered at the second communication device, according to an embodiment. As another example, the request is for station readiness information regarding whether the second communication device is ready to one or more of: receive packets, transmit packets, participate in a procedure (such as a ranging measurement procedure, a channel measurement procedure, etc.) provide requested information, etc., according to an embodiment. As yet another example, the request is for acknowledgement information regarding a MAC data unit transmitted by the first communication device to the second communication device, according to an embodiment.

In an embodiment, the request is included in a trigger frame that is configured to prompt the second communication device to transmit a responsive packet a defined time period (e.g., a short interframe space (SIFS) as defined by the IEEE Standard, or another suitable time period), and the method 700 further includes the first communication device generating (e.g., the AP 114 generating, the network interface device 122 generating, etc.) the trigger frame; and block 704 includes transmitting the trigger frame.

At block 708, the first communication device receives from the second communication device an MPDU delimiter having a feedback indication field and a feedback content field. In an embodiment, the feedback indication field includes a first value that indicates that the MPDU delimiter includes the feedback content field rather than an MPDU length field corresponding to a second value of the feedback indication field; and the feedback content field includes requested status information regarding the second communication device. In various embodiments, the MPDU delimiter has a format as described above with reference to any of FIGS. 5A-D. In other embodiments, the MPDU delimiter has a suitable format different than the formats described above with reference to FIGS. 5A-D.

In another embodiment, the MPDU delimiter received at block 608 further comprises: a feedback type field that includes an indication of a type of content in the feedback content field, wherein the type of content is selected from a plurality of different types of content. In an embodiment, the plurality of different types of content comprises at least two of: i) buffer status information, ii) channel availability information, iii) station readiness information, and iv) acknowledgment information.

In another embodiment, the MPDU delimiter received at block 608 further comprises: a delimiter signature field, the delimiter field having a predefined bit pattern for detection, at the first communication device, of the MPDU delimiter.

In an embodiment, the delimiter received at block 708 is received in an A-MPDU having a format such as described with reference to FIG. 4. In an embodiment, A-MPDU is received in a packet that has a format the same as or similar to the PHY data unit discussed with reference to FIG. 3. In an embodiment, the packet has a PHY header, and the first communication device uses information in the PHY header to determine that the MPDU delimiter in the packet is intended for the first communication device.

At block 712, the first communication device extracts the requested status information from the MPDU delimiter received at block 708. In an embodiment, extracting the requested status information at block 712 includes extracting the requested status information from the feedback content field.

Figure 8:
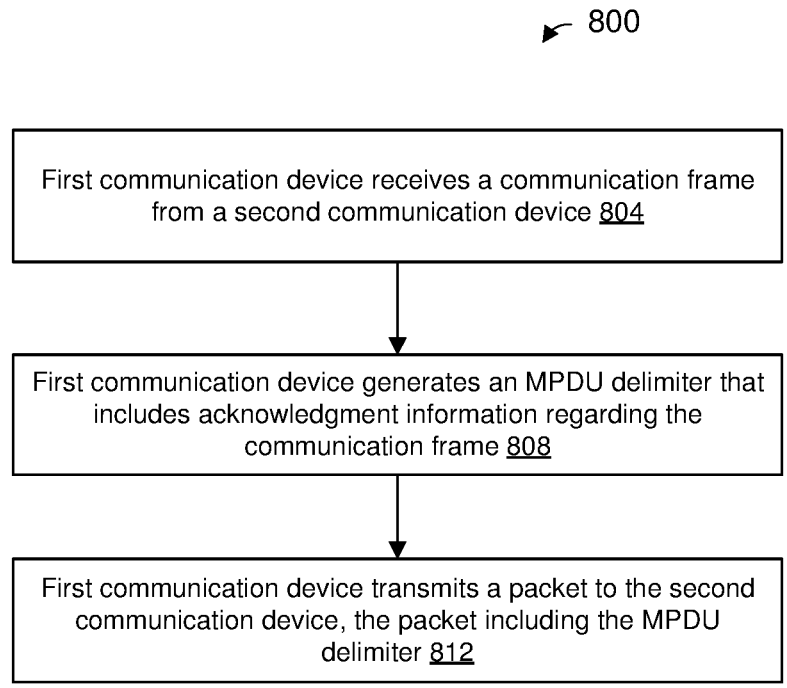
FIG. 8 is a flow diagram of an example method for providing acknowledgement information in a communication network using an MPDU delimiter such as the MPDU delimiters of FIGS. 5A-D, according to another embodiment.

FIG. 8 is a flow diagram of an example method 800 for acknowledging a communication frame transmitted in a communication network, according to an embodiment. In some embodiments, the network interface device 122 and/or the network interface 162 of FIG. 1 is configured to implement the method 800, and the method 800 is described with reference to FIG. 1 for explanatory purposes. In other embodiments, the method 800 is implemented by another suitable communication device.

At block 804, a first communication device receives (e.g., the AP 114 receives, the network interface device 122 receives, the client station 154 receives, the network interface device 162 receives, etc.) the communication frame from a second communication device. In an embodiment, the communication frame received at block 804 is an MPDU.

At block 808, in response to receiving the communication frame at block 804, the first communication device generates an MPDU delimiter having a feedback indication field and a feedback content field. In an embodiment, generating the MPDU delimiter at block 608 includes: generating the feedback indication field to include a first value that indicates the MPDU delimiter includes the feedback content field rather than an MPDU length field corresponding to a second value of the feedback indication field, and generating the feedback content field to include acknowledgement information regarding the communication frame received at block 804. In various embodiments, generating the MPDU delimiter at block 808 includes generating an MPDU delimiter as described above with reference to any of FIGS. 5A-D. In other embodiments, generating the MPDU delimiter at block 808 includes generating an MPDU delimiter having a suitable format different than the formats described above with reference to FIGS. 5A-D.

In another embodiment, generating the MPDU delimiter at block 808 further comprises: generating the MPDU delimiter to further include a feedback type field to include an indication of a type of content in the feedback content field, wherein the type of content is selected from a plurality of different types of content. In an embodiment, the plurality of different types of content comprises at least two of: i) buffer status information, ii) channel availability information, iii) station readiness information, and iv) acknowledgment information.

In another embodiment, generating the MPDU delimiter at block 808 further comprises: generating the MPDU delimiter to further include a delimiter signature field, the delimiter field having a predefined bit pattern for detection, at the second communication device, of the MPDU delimiter.

At block 812, in response to receiving the communication frame at block 804, the first communication device transmits a packet that includes the MPDU delimiter generated at block 808. In an embodiment, the packet has a format the same as or similar to the PHY data unit discussed with reference to FIG. 3. In an embodiment, the MPDU delimiter is included in an A-MPDU having a format the same as or similar to the A-MPDU discussed with reference to FIG. 4.

Figure 9:
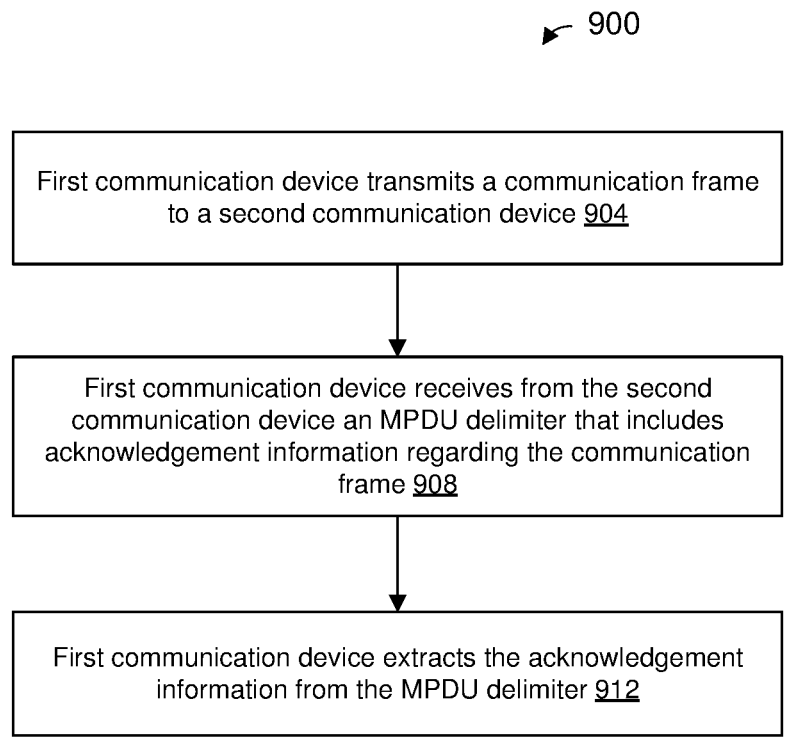
FIG. 9 is a flow diagram of an example method for transmitting a communication frame in a communication network and receiving acknowledgement information for the communication frame in an MPDU delimiter such as the MPDU delimiters of FIGS. 5A-D, according to an embodiment.

FIG. 9 is a flow diagram of an example method 900 for transmitting a communication frame in a communication network, according to an embodiment. In some embodiments, the network interface device 122 and/or the network interface 162 of FIG. 1 is configured to implement the method 900, and the method 900 is described with reference to FIG. 1 for explanatory purposes. In other embodiments, the method 900 is implemented by another suitable communication device.

At block 904, a first communication device transmits (e.g., the AP 114 transmits, the network interface device 122 transmits, the client station 154 transmits, the network interface device 162 transmits, etc.) to a second communication device a communication frame. In an embodiment, the communication frame comprises an MPDU.

At block 908, the first communication device receives from the second communication device an MPDU delimiter that includes acknowledgement information regarding the communication frame transmitted at block 904. In an embodiment, the MPDU delimiter includes a feedback content subfield, and the acknowledgement information is included in the feedback content subfield. In an embodiment, the MPDU delimiter also includes a feedback indication subfield that comprises a first value indicating that the MPDU delimiter includes the feedback content field rather than an MPDU length field corresponding to a second value of the feedback indication field. In various embodiments, the MPDU delimiter has a format as described above with reference to any of FIGS. 5A-D. In other embodiments, the MPDU delimiter has a suitable format different than the formats described above with reference to FIGS. 5A-D.

In another embodiment, the MPDU delimiter received at block 908 further comprises: a feedback type field that includes an indication of a type of content in the feedback content field, wherein the type of content is selected from a plurality of different types of content. In an embodiment, the plurality of different types of content comprises at least two of: i) buffer status information, ii) channel availability information, iii) station readiness information, and iv) acknowledgment information.

In another embodiment, the MPDU delimiter received at block 908 further comprises: a delimiter signature field, the delimiter field having a predefined bit pattern for detection, at the first communication device, of the MPDU delimiter.

In an embodiment, the delimiter received at block 908 is received in an A-MPDU having a format such as described with reference to FIG. 4. In an embodiment, the A-MPDU is received in a packet that has a format the same as or similar to the PHY data unit discussed with reference to FIG. 3. In an embodiment, the packet has a PHY header, and the first communication device uses information in the PHY header to determine that the MPDU delimiter in the packet is intended for the first communication device.

At block 912, the first communication device extracts the acknowledgement information from the MPDU delimiter received at block 908. In an embodiment, extracting the acknowledgement information at block 912 includes extracting the acknowledgement information from the feedback content field.

In an embodiment, the method 900 further comprises the first communication device analyzing the acknowledgement information extracted at block 912 to determine whether the second communication device correctly received the communication frame transmitted at block 904.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a computer readable memory such as a random access memory (RAM), a read only memory (ROM), a flash memory, etc. The software or firmware instructions include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a wireless communication network for providing status information, the method comprising:
   receiving, at a first communication device, a request from a second communication device for status information regarding the first communication device;
   in response to receiving the request, generating, at the first communication device, a media access control (MAC) protocol data unit (MPDU) delimiter having i) a feedback indication field and ii) a feedback content field, wherein generating the MPDU delimiter includes:
      generating the feedback indication field to include a first value that indicates the MPDU delimiter includes the feedback content field rather than an MPDU length field corresponding to a second value of the feedback indication field, and
      generating the feedback content field to include requested status information regarding the first communication device; and
   in response to receiving the request, transmitting, by the first communication device, a packet that includes the MPDU delimiter.

2. The method of claim 1, wherein generating the MPDU delimiter further comprises:
   generating the MPDU delimiter to further include a feedback type field to include an indication of a type of content in the feedback content field, wherein the type of content is selected from a plurality of different types of content.

3. The method of claim 2, wherein the plurality of different types of content comprises at least two of:
   buffer status information;
   channel availability information; and
   station readiness information.

4. The method of claim 3, wherein the plurality of different types of content further comprises:
   acknowledgment information.

5. The method of claim 1, wherein generating the MPDU delimiter further comprises:
   generating the MPDU delimiter to further include a delimiter signature field to include a predefined bit pattern for detection, at the second communication device, of the MPDU delimiter.

6. The method of claim 1, further comprising:
   generating an aggregate MPDU (A-MPDU) that includes the MPDU delimiter; and
   generating the packet to include the A-MPDU.

7. A wireless device, comprising:
   a network interface device associated with a first communication device, wherein the network interface device is implemented on one or more integrated circuit (IC) devices, and wherein the network interface device is configured to:
      receive a request from a second communication device for status information regarding the first communication device, and
      in response to receiving the request, generate a media access control (MAC) protocol data unit (MPDU) delimiter having i) a feedback indication field and ii) a feedback content field, wherein generating the MPDU delimiter includes:
         generating the feedback indication field to include a first value that indicates the MPDU delimiter includes the feedback content field rather than an MPDU length field corresponding to a second value of the feedback indication field, and
         generating the feedback content field to include requested status information regarding the first communication device;
   wherein the network interface device is further configured to transmit a packet that includes the MPDU delimiter in response to receiving the request.

8. The wireless device of claim 7, wherein the network interface device is further configured to:
   generate the MPDU delimiter to further include a feedback type field to include an indication of a type of content in the feedback content field, wherein the type of content is selected from a plurality of different types of content.

9. The wireless device of claim 8, wherein the plurality of different types of content comprises at least two of:
buffer status information;
channel availability information; and
station readiness information.

10. The wireless device of claim 9, wherein the plurality of different types of content further comprises:
acknowledgment information.

11. The wireless device of claim 7, wherein the network interface device is further configured to:
generate the MPDU delimiter to further include a delimiter signature field to include a predefined bit pattern for detection, at the second communication device, of the MPDU delimiter.

12. The wireless device of claim 7, wherein the network interface device is further configured to:
generate an aggregate MPDU (A-MPDU) that includes the MPDU delimiter; and
generate the packet to include the A-MPDU.

13. A method in a wireless communication network for acknowledging a communication frame, the method comprising:
receiving, at a first communication device, the communication frame from a second communication device;
in response to receiving the communication frame, generating, at the first communication device, a media access control (MAC) protocol data unit (MPDU) delimiter having i) a feedback indication field and ii) a feedback content field, wherein generating the MPDU delimiter includes:
generating the feedback indication field to include a first value that indicates the MPDU delimiter includes the feedback content field rather than an MPDU length field corresponding to a second value of the feedback indication field, and
generating the feedback content field to include acknowledgment information regarding the communication frame; and
in response to receiving the communication frame, transmitting, by the first communication device, a packet that includes the MPDU delimiter.

14. The method of claim 13, wherein generating the MPDU delimiter further comprises:
generating the MPDU delimiter to further include a feedback type field to include an indication that the MPDU delimiter include acknowledgment information, wherein the type of content is selected from a plurality of different types of content.

15. The method of claim 14, wherein the plurality of different types of content comprises acknowledgment information, and at least one of:
buffer status information;
channel availability information; and
station readiness information.

16. The method of claim 13, wherein generating the MPDU delimiter further comprises:
generating the MPDU delimiter to further include a delimiter signature field to include a predefined bit pattern for detection, at the second communication device, of the MPDU delimiter.

17. A wireless device, comprising:
a network interface device associated with a first communication device, wherein the network interface device is implemented on one or more integrated circuit (IC) devices, and wherein the network interface device is configured to:
receive a communication frame from a second communication device, and
in response to receiving the communication frame, generate a media access control (MAC) protocol data unit (MPDU) delimiter having i) a feedback indication field and ii) a feedback content field, wherein generating the MPDU delimiter includes:
generating the feedback indication field to include a first value that indicates the MPDU delimiter includes the feedback content field rather than an MPDU length field corresponding to a second value of the feedback indication field, and
generating the feedback content field to include acknowledgment information regarding the communication frame;
wherein the network interface device is further configured to transmit a packet that includes the MPDU delimiter in response to receiving the communication frame.

18. The wireless device of claim 17, wherein the network interface device is further configured to:
generate the MPDU delimiter to further include a feedback type field to include an indication that the MPDU delimiter includes acknowledgment information, wherein the type of content is selected from a plurality of different types of content.

19. The wireless device of claim 18, wherein the plurality of different types of content comprises acknowledgment information, and at least one of:
buffer status information;
channel availability information; and
station readiness information.

20. The wireless device of claim 17, wherein the network interface device is further configured to:
generate the MPDU delimiter to further include a delimiter signature field to include a predefined bit pattern for detection, at the second communication device, of the MPDU delimiter.

* * * * *